UNITED STATES PATENT OFFICE.

ALFRED W. PRATT, OF FLUSHING, NEW YORK, ASSIGNOR OF ONE-HALF HIS RIGHT TO HENRY S. LAMBERT, OF ORANGE, NEW JERSEY.

IMPROVEMENT IN COMPOSITIONS FOR DRYING PAINTS AND OILS.

Specification forming part of Letters Patent No. 211,928, dated February 4, 1879; application filed November 30, 1878.

*To all whom it may concern:*

Be it known that I, ALFRED W. PRATT, of Flushing, in the county of Queens and State of New York, have invented a certain new and useful Composition for Drying Paints and Oils; and I do hereby declare that the following is a full, clear, and exact description thereof, which will enable others skilled in the art to which it appertains to make and use the same.

To prepare forty-five gallons of my drying composition, take ten pounds of caustic soda, seven and a half gallons of oil, (linseed preferred,) thirty-four pounds of rosin or other resinous substance, fourteen pounds of some salt of lead or salts of lead, and ten gallons of a solution of chloride of manganese left as a residuum after heating black oxide of manganese in contact with muriatic acid, as in the ordinary process of manufacturing free chlorine.

In preparing the composition, I first dissolve the caustic soda in water in such proportions as to make a strong lye. I then put this solution into a receptacle with the oil, and boil them until the mixture becomes plastic. Then I mix the dilute residuum or dilute chloride of manganese above referred to with an aqueous solution of some salt of lead or salts of lead. Then I mix this mixture with the mixture of lye and oil above mentioned. The latter or plastic mixture absorbs the former or liquid mixture. I then cleanse the resultant plastic mass with water and dry it. Then I add the rosin. Next I heat the mixture in any suitable receptacle until it becomes a homogeneous mass. I then remove the composition from the receptacle and allow it to cool. After being diluted with thirty-five gallons of oil, (for which turpentine or naphtha may be partly or wholly substituted,) the composition is ready for use as a liquid drier for facilitating the drying of paints and oils.

I prefer to use as an ingredient in this composition nitrate of lead or brown or white sugar of lead; but any other salt of lead may be substituted therefor. Other alkalies may be used instead of caustic soda. The proportion of the ingredients may be varied considerably.

Having thus fully described my invention, what I claim as new, and desire to secure by Letters Patent, is—

A composition of matter compounded of caustic soda, oil, a resinous substance, aqueous solution of chloride of manganese, and a salt of lead, substantially as set forth.

In testimony that I claim the foregoing as my own I affix my signature in presence of two witnesses.

ALFRED W. PRATT.

Witnesses:
W. H. BABCOCK,
H. L. LAMBERT.